J. HICKSON.
ROAD RAIL.
APPLICATION FILED JULY 13, 1922.

1,435,005.

Patented Nov. 7, 1922.

J. Hickson, Inventor

By [signature], Attorney

Patented Nov. 7, 1922.

1,435,005

UNITED STATES PATENT OFFICE.

JOSEPH HICKSON, OF MOUNT GILEAD, OHIO.

ROAD RAIL.

Application filed July 13, 1922. Serial No. 574,810.

*To all whom it may concern:*

Be it known that I, JOSEPH HICKSON, a citizen of the United States, residing at Mount Gilead, in the county of Morrow and State of Ohio, have invented a new and useful Road Rail, of which the following is a specification.

This invention relates to road construction, and more particularly to highway roads.

The object of the invention is to provide means for distributing the weight of vehicles traveling over highway roads and which greatly prolong the life of the road avoiding constant repairing which is required in roads as ordinarily constructed.

Another object is to provide a highway road having track rails embedded therein with their treads flush with the top of the grade of the road and which have means to prevent skidding of vehicles traveling thereover.

Another object is to provide a road rail equipped with means to facilitate the passing of vehicles onto and off the rails without the danger of skidding, and which also operates to strengthen the rails.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1:
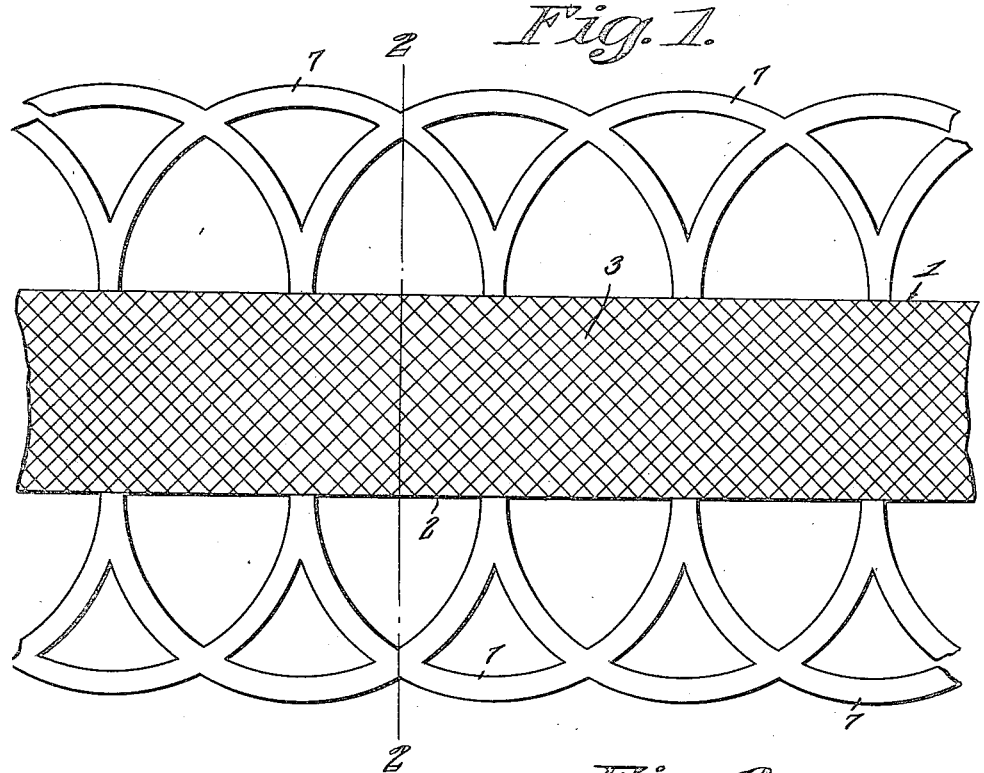
Figure 2:
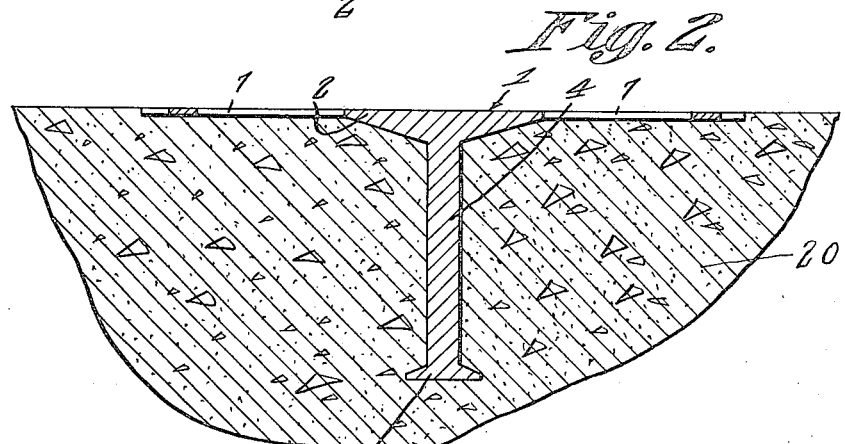

Figure 1 represents a plan view of a road rail constructed in accordance with this invention, and Fig. 2 is a transverse section taken on the line 2—2 of Fig. 1.

In the embodiment illustrated, a road rail 1 is shown, it of course being understood that these rails are arranged in pairs and which is designed to be embedded in the road structure which is usually composed of cement, or similar material and which is shown in Fig. 2 at 20.

This rail 1 is substantially T-shaped in cross section as shown in Fig. 2 with the head 2 thereof extending laterally on opposite sides of the web 4 of a width sufficient to permit vehicle wheels to travel thereon without requiring effort on the part of the driver to retain them in position. The tread of this head 2 may be serrated as shown at 3 to prevent skidding of vehicle wheels, or it may be made plain, as desired.

This rail 1 is also provided with an anchoring base 5 which when embedded in the road bed 20 will prevent displacement of the rail.

The rail 1 is also provided with laterally extending ribs 7 which are preferably made semi-circular in shape being arranged flush or substantially so with the head 2 of the rail, and are designed to facilitate the passage of a vehicle onto the rail without skidding.

In the use of this improved rail 1, they are arranged in pairs in the roadbed 20, being spaced apart distances corresponding to the distance between the wheels of vehicles, which vehicle wheels are usually standard.

A vehicle traveling on these embedded rails will obviously have its weight distributed over a considerable area of the road bed and consequently the wear on the road bed incident to the passage of the vehicle in contact therewith will be prevented.

The approaching ribs 7 facilitate the mounting of a vehicle on the rail without danger of skidding.

A road constructed with these rails 1 embedded therein will obviously last much longer without repair, than those in which no rails are employed, and they will provide smooth surfaces for the travel of the vehicles, and thus enhance the pleasure of motoring. Of course the constructing of a road with these embedded rails will be more expensive, but the absence of repairs will counter-balance this expense, while at the same time increasing the pleasure and comfort of travelers.

I claim:—

1. A road rail to be embedded in a road bed, said rail being substantially T-shaped in cross section and equipped with an anchoring base and laterally extending curved ribs projecting from the side edges of the head of said rail to facilitate mounting of vehicles on the rail without skidding.

2. A road rail to be embedded in a road bed, said rail being substantially T-shaped in cross section and equipped with an anchoring base and laterally extending curved ribs projecting from the side edges of the head of said rail to facilitate mounting of vehicles on the rail without skidding.

In testimony that I claim the foregoing as my own, I have hereto affixed my signature in the presence of two witnesses.

JOSEPH HICKSON.

Witnesses:
CHARLES C. HICKSON,
W. M. KAUFMAN.